United States Patent
Thusoo et al.

(10) Patent No.: US 7,603,347 B2
(45) Date of Patent: Oct. 13, 2009

(54) MECHANISM FOR EFFICIENTLY EVALUATING OPERATOR TREES

(75) Inventors: Ashish Thusoo, Foster City, CA (US); Ravi Murthy, Fremont, CA (US); Sivasankaran Chandrasekar, Palo Alto, CA (US); Eric Sedlar, San Francisco, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 10/944,171

(22) Filed: Sep. 16, 2004

(65) Prior Publication Data

US 2005/0228768 A1 Oct. 13, 2005

Related U.S. Application Data

(63) Continuation-in-part of application No. 10/884,311, filed on Jul. 2, 2004, now Pat. No. 7,499,915.

(60) Provisional application No. 60/582,706, filed on Jun. 23, 2004, provisional application No. 60/580,445, filed on Jun. 16, 2004, provisional application No. 60/560,927, filed on Apr. 9, 2004.

(51) Int. Cl.
*G06F 17/30* (2006.01)
(52) U.S. Cl. ............ 707/4; 707/E17.127; 707/E17.125; 715/234
(58) Field of Classification Search .................. 707/3–5, 707/101, 104.1, E17.122, E17.125, E17.127; 715/234
See application file for complete search history.

(56) References Cited

U.S. PATENT DOCUMENTS 4,439,837 A 3/1984 Aiena et al.

(Continued)

FOREIGN PATENT DOCUMENTS

GB 2409078 A 6/2005

(Continued)

OTHER PUBLICATIONS

Krishnaprasad et al., Query Rewrite for XML in Oracle XML DB, 2004, Proceedings of the 30th VLDB Conference, 12 pages.*

(Continued)

*Primary Examiner*—Leslie Wong
(74) *Attorney, Agent, or Firm*—Hickman Palermo Truong & Becker LLP (57) ABSTRACT

An XPath expression is converted into a tree-based representation where each node represents an operation to be performed and the links between nodes in the tree represent the flow of data between operations. The conversion may involve creating a parse tree for the XPath expression, and then converting the parse tree into an operator tree. The operator tree is constructed in such a way that execution of the XPath expression begins at the leaf nodes of the operator tree, and the results are then passed up the tree. After each node is executed, the results are either (1) passed to a filter that filters the results with a predicate statement or (2) passed to another node to be operated upon. This occurs until no nodes remain to be executed.

34 Claims, 3 Drawing Sheets

U.S. PATENT DOCUMENTS

| | | | |
|---|---|---|---|
| 4,536,873 A | 8/1985 | Leete | |
| 5,088,032 A | 2/1992 | Bosack | |
| 5,590,324 A | 12/1996 | Leung et al. | |
| 5,643,633 A | 7/1997 | Telford et al. | |
| 5,870,590 A | 2/1999 | Kita et al. | |
| 5,878,410 A | 3/1999 | Zbikowski et al. | |
| 5,905,982 A | 5/1999 | Carey et al. | |
| 6,026,390 A * | 2/2000 | Ross et al. | 707/2 |
| 6,516,327 B1 | 2/2003 | Zondervan et al. | |
| 6,519,597 B1 | 2/2003 | Cheng et al. | |
| 6,584,459 B1 | 6/2003 | Chang et al. | |
| 6,604,100 B1 | 8/2003 | Fernandez et al. | |
| 6,636,845 B2 | 10/2003 | Chau et al. | |
| 6,643,633 B2 | 11/2003 | Chau et al. | |
| 6,654,734 B1 | 11/2003 | Mani et al. | |
| 6,782,380 B1 | 8/2004 | Thede | |
| 7,028,028 B1 | 4/2006 | Balmin et al. | |
| 7,031,956 B1 * | 4/2006 | Lee et al. | 707/3 |
| 7,062,507 B2 | 6/2006 | Wang et al. | |
| 7,096,224 B2 | 8/2006 | Murthy et al. | |
| 7,124,137 B2 | 10/2006 | Lin et al. | |
| 7,139,746 B2 | 11/2006 | Shin et al. | |
| 7,171,404 B2 | 1/2007 | Lindblad et al. | |
| 7,171,407 B2 * | 1/2007 | Barton et al. | 707/4 |
| 7,181,438 B1 | 2/2007 | Szabo | |
| 7,216,127 B2 | 5/2007 | Auerbach | |
| 2001/0049675 A1 | 12/2001 | Mandler et al. | |
| 2002/0073019 A1 | 6/2002 | Deaton | |
| 2002/0078068 A1 | 6/2002 | Krishnaprasad et al. | |
| 2002/0100027 A1 | 7/2002 | Binding et al. | |
| 2002/0116457 A1 | 8/2002 | Eshleman et al. | |
| 2002/0152267 A1 | 10/2002 | Lennon | |
| 2002/0184401 A1 | 12/2002 | Kadel Jr. et al. | |
| 2003/0028563 A1 | 2/2003 | Stutz et al. | |
| 2003/0167456 A1 | 9/2003 | Sabharwal | |
| 2003/0177341 A1 | 9/2003 | Devillers | |
| 2003/0200214 A1 | 10/2003 | Doole et al. | |
| 2003/0212662 A1 | 11/2003 | Shin et al. | |
| 2003/0233618 A1 | 12/2003 | Wan | |
| 2004/0015783 A1 | 1/2004 | Lennon et al. | |
| 2004/0044659 A1 | 3/2004 | Judd et al. | |
| 2004/0064466 A1 * | 4/2004 | Manikutty et al. | 707/100 |
| 2004/0088320 A1 | 5/2004 | Perry | |
| 2004/0103105 A1 | 5/2004 | Lindblad et al. | |
| 2004/0143581 A1 | 7/2004 | Bohannon et al. | |
| 2004/0148278 A1 * | 7/2004 | Milo et al. | 707/3 |
| 2004/0167864 A1 | 8/2004 | Wang et al. | |
| 2004/0167904 A1 | 8/2004 | Wen et al. | |
| 2004/0193575 A1 | 9/2004 | Chen et al. | |
| 2004/0199524 A1 | 10/2004 | Rys et al. | |
| 2004/0205082 A1 * | 10/2004 | Fontoura et al. | 707/101 |
| 2004/0215600 A1 | 10/2004 | Aridor et al. | |
| 2004/0221226 A1 | 11/2004 | Lin et al. | |
| 2004/0260691 A1 | 12/2004 | Desai et al. | |
| 2004/0267719 A1 | 12/2004 | Doherty et al. | |
| 2004/0267760 A1 * | 12/2004 | Brundage et al. | 707/100 |
| 2005/0004892 A1 | 1/2005 | Brundage et al. | |
| 2005/0022115 A1 | 1/2005 | Baumgartner et al. | |
| 2005/0038688 A1 | 2/2005 | Collins et al. | |
| 2005/0050016 A1 | 3/2005 | Stanoi et al. | |
| 2005/0091188 A1 | 4/2005 | Pal et al. | |
| 2005/0097084 A1 | 5/2005 | Balmin et al. | |
| 2005/0102256 A1 | 5/2005 | Bordawekar et al. | |
| 2005/0108630 A1 | 5/2005 | Wasson et al. | |
| 2005/0114314 A1 | 5/2005 | Fan et al. | |
| 2005/0120031 A1 | 6/2005 | Ishii | |
| 2005/0160076 A1 | 7/2005 | Kanemasa | |
| 2005/0160108 A1 | 7/2005 | Charlet et al. | |
| 2005/0228792 A1 | 10/2005 | Chandrasekaran et al. | |
| 2005/0228818 A1 | 10/2005 | Murthy et al. | |
| 2005/0229158 A1 | 10/2005 | Thusoo et al. | |
| 2005/0257201 A1 | 11/2005 | Rose et al. | |
| 2005/0289125 A1 * | 12/2005 | Liu et al. | 707/3 |
| 2005/0289138 A1 | 12/2005 | Cheng et al. | |
| 2006/0195476 A1 | 8/2006 | Nori et al. | |

FOREIGN PATENT DOCUMENTS

| | | |
|---|---|---|
| WO | WO 03/027908 A2 | 4/2003 |

OTHER PUBLICATIONS

Khan et al., A performance Evaluation of Storing XML Data i Relational Database Management Systems, 2001, ACM, 8 pages.*

Chen et al., From Tree Patterns to Generalized Tree Patterns: On Efficient Evaluation of XQuery, 2003, Proceedings of the $29^{th}$ VLDB Conference, pp. 1-12.*

Daniele Braga et al., "A Graphical Environment to Query XML Data with Query," Proceedings of the Fourth International Conference on Web Information Systems Engineering (WISE '03), 2003, IEEE, 10 pages.

McHugh, Jason et al., "Query Optimization for XML", XP-002333353, *Proceedings of the $25^{th}$ VLDB Conference* (1999) pp. 315-326.

Yoshikawa, Masatoshi et al., "XRel: A Path-Based Approach to Storage and Retrieval of XML Document Using Relational Databases", XP-001143686, *ACM Transactions on Internet Technology* (2001), pp. 110-141.

Notification of Transmittal of the International Search Report and the Written Opinion of the International Search Authority, or the Declaration received from International application No. PCT/US2005/011762.

Pending claims from International application No. PCT/US2005/011762.

International Searching Authority, "Notification of Transmittal of the International Search Report and the Written Opinion of the International Searching Authority, or the Declaration," PCT/US2005/011763, dated Aug. 6, 2005, 12 pages.

Current Claims, PCT/US2005/011763, 4 pages.

Cooper, Brian F. et al., "A Fast Index for Semistructured Data," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

International Preliminary Examining Authority, "Notification of Transmittal of the International Preliminary Report of Patentability," PCT/US2005/020795, dated Aug. 7, 2006, 10 pages.

International Preliminary Examining Authority, "Written Opinion of the International Preliminary Examining Authority," PCT/US2005/020795, received May 31, 2006, 5 pages.

Claims, PCT/US2005/020795, 3 pages.

W3C, "XML Fragment Interchange," W3C Working Draft, Jun, 30, 1999, XP-002167090, 17 pages.

Kudrass, Thomas, "Management of XML Documents without Schema in Relational Database Systems," XP004347776, 10 pages.

MacKenzie, David et al., "Finding Files", GNU Findutils Version 4.1.2, Nov. 1994, 38 pages.

Claims, Foreign Application No. 200580018627.9 (50277-3171), 3 pages.

State Intellectual Property Office of P.R.C., "Notification of the First Office Action", Foreign Application No. 200580018627.9 (50277-3171), mailed Oct. 12, 2007, 9 pages.

Mackenzie et al., "Finding Files" Finding Utils, Version 4.1.2, Source Code, GNU.org, Nov. 31, 1994, source files, code.c; 3 pages.

Cormen et al., "Introduction to Algorithms", MIT Press, $2^{nd}$ Edition, 2001, 4 pages.

Shankar Pal et al., "Indexing XML Data Stored in a Relational Database", Proceedings of the $30^{th}$ VLDB Conference, 2004, 12 pages.

Mackenzie et al., "Finding Files", FindUtils, Version 4.1.2, Source Code, GNU.org, Nov. 1997, source files, code. C, 22 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

Girardot et al., "Millau: an encoding format for efficient representation and exchange of XMLover the Web", IBM Almaden Research Center, 24 pages, May 2000.

Shankar Pal et al., "Indexing XML Data Stored in a Relational Database", Proceedings of the 30th VLDB Conference, 2004, 12 pages.

Mackenzie et al., "Finding Files", FindUtils, Version 4.1.2, Source Code, GNU.org, Nov. 1997, source files, code. C, 22 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Funderburk, J.E., et al., "XML Programming with SQL/XML and XQuery", XP-002353603, IBM Systems Journal vol. 41, No. 4, 2002, 24 pages.

* cited by examiner

FIG. 1

--Prior Art--

MECHANISM FOR EFFICIENTLY EVALUATING OPERATOR TREES

PRIORITY CLAIM

This application claims priority to U.S. Provisional Patent Application Ser. No. 60/560,927, entitled XML INDEX FOR XML DATA STORED IN VARIOUS STORAGE FORMATS, filed on Apr. 9, 2004, the contents of which are herein incorporated by reference in their entirety for all purposes.

This application claims priority to U.S. Provisional Patent Application Ser. No. 60/580,445, entitled XML INDEX FOR XML DATA STORED IN VARIOUS STORAGE FORMATS, filed on Jun. 16, 2004, the contents of which are herein incorporated by reference in their entirety for all purposes.

This application claims priority to U.S. Provisional Patent Application Ser. No. 60/582,706, entitled TECHNIQUES FOR PROCESSING XQUERIES IN A RELATIONAL DATABASE MANAGEMENT SYSTEM, filed on Jun. 23, 2004, the contents of which are herein incorporated by reference in their entirety for all purposes.

This application claims priority to and is a continuation in part of U.S. patent application Ser. No. 10/884,311, entitled INDEX FOR ACCESSING XML DATA, filed on Jul. 2, 2004, the contents of which are herein incorporated by reference in their entirety for all purposes.

This application is related to U.S. patent application Ser. No. 10/944,177, entitled INDEX MAINTENANCE FOR OPERATIONS INVOLVING INDEXED XML DATA, filed on same day herewith, the contents of which are herein incorporated by reference in their entirety for all purposes.

This application is related to U.S. patent application Ser. No. 10/944,170, now issued as U.S. Pat. No. 7,398,265 issued Jul. 8, 2008, entitled EFFICIENT QUERY PROCESSING OF XML DATA USING XML INDEX, the contents of which are herein incorporated by reference in their entirety for all purposes.

FIELD OF THE INVENTION

The present invention relates to XPath expressions and their use in querying relational databases for elements in XML documents and, more specifically, to representing XPath expressions in a tree format.

BACKGROUND

Because of the popularity of XML as a data exchange format that supports hierarchical relationships among elements, and because of the power of relational database management systems (DBMSs) to update and retrieve data, there is a demand for generating XML data output from relational databases and storing XML data into relational databases.

XPath is a language for addressing XML documents. XPath also provides basic facilities for manipulation of strings, numbers and Booleans. XPath operates on the abstract, logical structure of an XML document, rather than its surface syntax. XPath gets its name from its use of a path notation, as in URLs, for navigating through the hierarchical structure of an XML document.

The primary syntactic construct in XPath is the expression, which is evaluated to yield an object. XPath expressions are described in Section 3 ("Expressions") of "XML Path Language (XPath)" (version 1.0). One important kind of expression is a location path. A location path selects a set of nodes relative to a context node. The result of evaluating an expression that is a location path is the node-set containing the nodes selected by the location path. Location paths can recursively contain expressions that are used to filter sets of nodes. The semantics of location paths are described in Section 2 ("Location Paths") of "XML Path Language (XPath)" (version 1.0).

To be used in querying XML documents in a database, an XPath expression must be converted to statements that conform to the database language supported by the database server that manages the database. Structured Query Language (SQL) is a database language supported by many database servers. Thus, for an XPath expression to be used to query XML documents managed by a database server that supports SQL, the XPath expression must be converted to statements that conform to the SQL language ("SQL statements").

Figure 1:
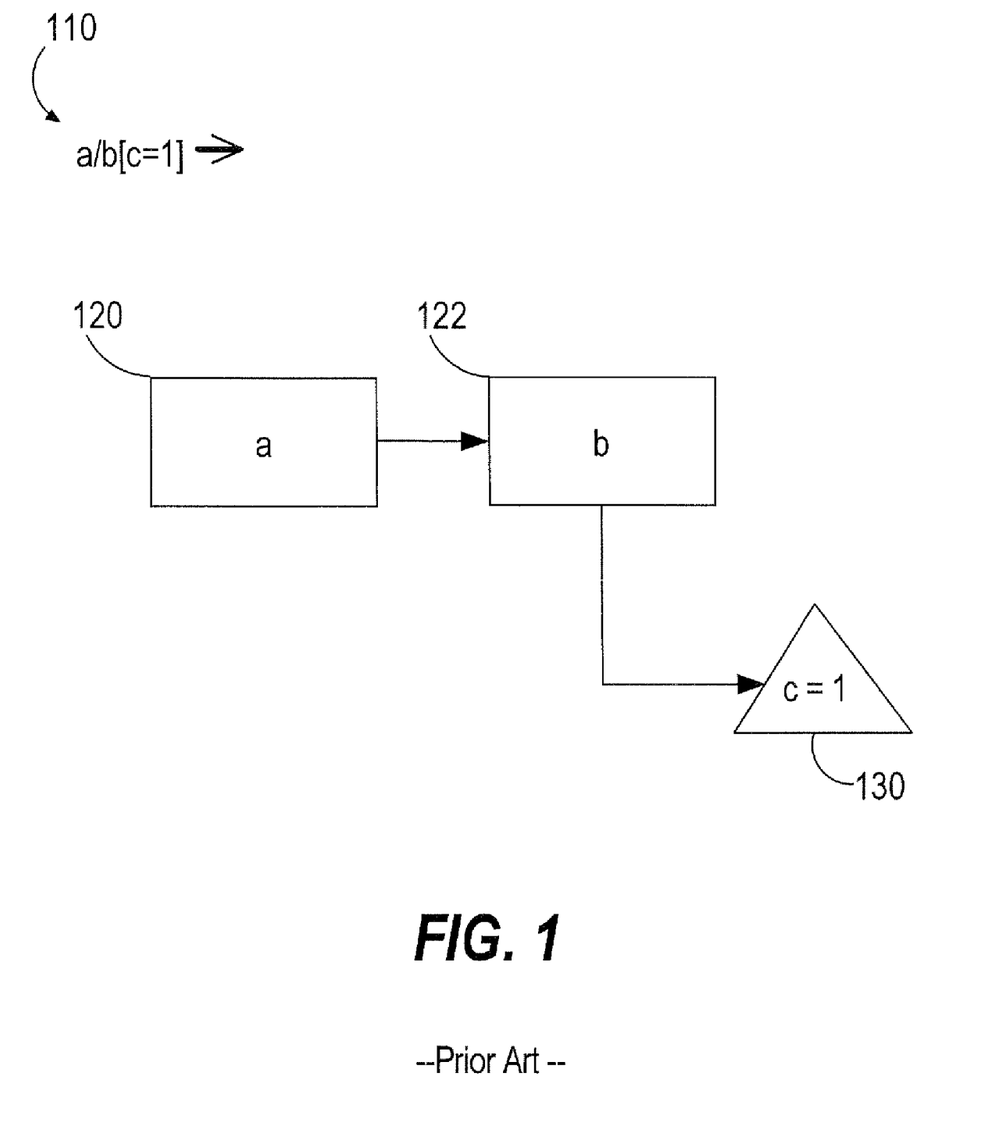
FIG. 1 shows a block diagram of an XPath expression and an example of how the XPath expression was evaluated according to prior art.

According to contemporary implementations, in order to convert XPath expressions into SQL statements, the XPath expression is broken up into a linked list of path components. FIG. 1 gives an example XPath expression with a corresponding block diagram of how the XPath expression was evaluated according to prior art. XPath expression 110 is parsed into path components a and b, and, within path component b, there is a predicate c=1. Consequently, the only way to evaluate such XPath expressions is by running through this parsed representation and calling an evaluation function for each parsed component. This "functional" approach of evaluation not only suffers from lengthy processing times, it is also unable to benefit from more optimal execution strategies.

Based on the foregoing, it is clearly desirable to provide techniques to reduce the processing time of XPath expressions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

According to an embodiment of the invention, an XPath expression is converted into a tree-based representation where each node represents an operation to be performed and the links between nodes in the tree represent the flow of data between operations.

In one embodiment, the conversion involves creating a parse tree for the XPath expression, and then converting the parse tree into an operator tree. The operator tree is constructed in such a way that execution of the XPath expression begins at the leaf nodes of the operator tree, and the results are then passed up the tree. After each node is executed, the results are either (1) passed to a filter that filters the results with a predicate statement or (2) passed to another node to be operated upon. This occurs until no nodes remain to be executed.

Some features of an operator tree are that such a tree implementation is more amenable to query rewrites that convert the xpath into an equivalent SQL on the XML Index. With the ability to rewrite the operator tree into SQL simply, the processing time of executing the query can be reduced and the full power of the SQL query optimizer can be used to generate fast and optimal execution plans that use the XML Index tables.

XPath Parse Trees

In present systems, a linked list is created for an XPath expression. FIG. 1 provides an example XPath expression with its corresponding linked list "parse tree" representation. As mentioned above, systems typically evaluate XPath expressions directly from the parse tree representation.

Referring to FIG. 1, expression 110 is divided into path components 120 and 122 and a predicate 130. Path component 120 correlates to child a of the root element in an XML document. Path component 122 correlates to child b of child a. Predicate 130, which signifies the expression "c=1," is within path component 122. For each parsed component, an evaluation function is called and executed.

Operators for XPath Operator Trees

According to one embodiment, instead of executing XPath operations based on the simple parsed tree representation thereof, an XPath operator tree is created in order to take advantage of query plan optimizations and query rewrites. Before the structure of the operator tree is described, a description of the operators is given.

Operators are defined for XPath 1.0 which work on rows of the form (<orderkey, type, nodelocation/nodevalue>), where "orderkey" is the Dewey key for the node, "type" is the type of the node, "nodelocation" is the location of the node, and "nodevalue" is the scalar value of the node. When "type" equals "SCALAR", then the last element of the tuple contains the node value. For complex types, the third element in the row contains the node locator. These fields can be generated either by a SAX decoder on the XML data or by the rows stored in the XML Index path table.

An XPath parse tree may be converted into an operator tree using the techniques that are described in greater detail hereafter. This conversion is defined below in addition to all the operators being listed. Execution semantics of these operators and any assertions of their inputs and/or outputs are provided.

Operator Tree Compilation Phases

In one embodiment, the following passes are made over the parse tree of an XPath expression in order to convert the parse tree into an operator tree. The phases include Normalization, Conversion, Index SQL generation and Execution. Each of these phases shall be described in greater detail hereafter.

Normalization Phase

A parse tree includes components that are referred to herein as axes. An axis specifies the relationship between the nodes selected by the component and the node on which it is applied. An axis may be either "forward" or "reverse". A forward axis is an axis that specifies child, descendant and following relationships. In contrast, a reverse axis is an axis that specifies parent, ancestor and preceeding relationships. A forward axis selects nodes that appear after the context node in the document. A reverse axis on the other hand selects nodes that appear before the context node in the document. Apart from these axes a self axis selects the context node itself.

In the Normalization phase, a normalized parse tree is created from the input parse tree by converting reverse axes into forward axes wherever possible. Well known algorithms are used to do this conversion. Intuitively, for example, an xpath component of the form b/ancestor::a can be rewritten into a[./descendant::b]. Similarly, b/preceeding::a is equivalent to a[./following::b]. The normalization phase applies these rules to the xpath parse tree and generates an equivalent xpath parse tree.

Conversion Phase

In the Conversion phase, actual conversion of the parse tree into an operator tree is performed. Specifically, an XPath expression may include location steps, predicates, built-in functions, and built-in operators. For each of these components the conversion rules needed to generate the operator tree are as follows.

A location step has two components: axis and node test. Depending on the axis the following operators are generated:

| | |
|---|---|
| a. | child axis → child operator |
| b. | descendant axis → descendant operator |
| c. | self axis → identity operator |
| d. | following axis → following operator |
| e. | following-sibling axis → following_Sibling operator |
| f. | descendant-or-self axis → descendantOrSelf operator |
| g. | attribute axis → attribute operator |
| h. | namespace axis → namespace operator |

Each of these operators additionally contains two fields in their context, which specifies the node test component of the location step. These files are testType and testData. For the different node tests the values for these fields are indicated below:

| | | |
|---|---|---|
| a. | QName | → (testType = QNAME_TEST, testData = QName) |
| b. | * | → (testType = WILDCARD_TEST, testData = null) |
| c. | NCName:* | → (testType = NC_WILDCARD_TEST, testData = NCName) |
| d. | text( ) | → (testType = TEXT_TEST, testData = null) |
| e. | comment( ) | → (testType = COMMENT_TEST, testData = null) |
| f. | node( ) | → (testType = NODE_TEST, testData = null) |
| g. | processing-instruction('literal') → (testType = PI_TEST, testData = literal) |

Figure 2:
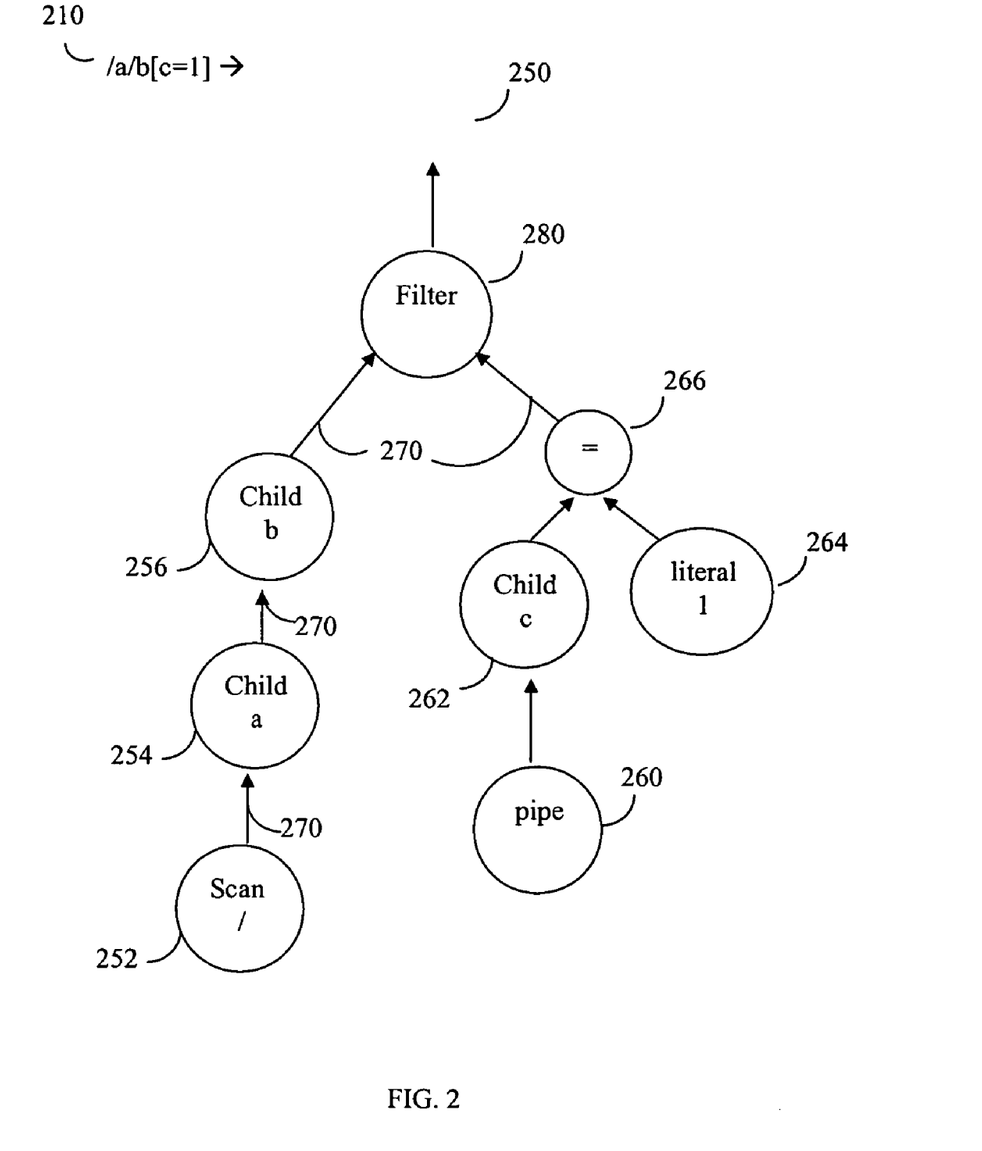
FIG. 2 shows a block diagram of an XPath expression and an example of how an operator tree may be built from that expression.

For every predicate defined on the location step, a filter operator is defined which has on its right hand side the operator tree corresponding to the relation predicate. For example, FIG. 2 illustrates a generic XPath expression 210 with a predicate (c=1) and the resulting operator tree 250. Scan node 252 is executed which retrieves the root element and the root element is passed to node 254. Data flow lines 270 signify the direction of data flow from each node. From the root element, all the children a are retrieved at node 254 and then passed to node 256. At node 256, all the children b are found from all the children a.

The results of node 256 are then passed to filter 280, which passes each row, one at a time, to pipe 260. Thus, for each row, the predicate c=1 is evaluated. First, at node 262, it is determined whether the row /a/b has a child c. If the row has a child c, then the row is evaluated to determine whether the node has a value equal to 1. If the node has a value equal to 1, then a 1 is generated to indicate that the particular row evaluated to true. The generated 1 is passed to filter 280 indicating that the particular row passed to pipe 260 evaluated to true. If the node does not have a value equal to 1, then a zero is generated and subsequently passed to filter 280 indicating that the particular row passed to pipe 260 evaluated to false. A row that evaluates to true is passed through filter 280 to be either displayed to a user or utilized by another process, depending on the context for which XPath expression 210 was initially produced.

With respect to built-in operators, there is a one-to-one correspondence between the parse operators and the operators in the operator tree. The conversion rules are as follows.

| | | |
|---|---|---|
| a. | '|' → | union operator |
| b. | 'or' → | or operator |
| c. | 'and' → | and operator |
| d. | '=' → | eq operator |
| e. | '!=' → | neq operator |
| f. | '<=' → | lte operator |
| g. | '<' → | lt operator |
| h. | '>=' → | gte operator |
| i. | '>' → | gt operator |
| j. | '+' → | add operator |
| k. | '−' → | sub operator |
| l. | 'mod' → | mod operator |
| m. | 'div' → | div operator |
| n. | '*' → | mult operator |

With respect to built-in functions, there is a one-to-one correspondence between the parse representation of pre-defined functions and the operators in the operator tree. The conversion rules are as follows:

| | | |
|---|---|---|
| o. | last( ) → | document sort operator followed by a count operator |
| p. | position( ) → | document sort operator followed by a pos operator |
| q. | count( ) → | count operator |
| r. | id( ) → | id operator |
| s. | local-name → | localName operator |
| t. | namespace-uri → | nspaceUri operator |
| u. | name → | name operator |
| v. | concat → | concat operator (This is a binary operator; however, in the language it can have a variable number of arguments. Nested operators are created in case there are more than two arguments.) |
| w. | starts-with → | startsWith operator |
| x. | contains → | contains operator |
| y. | substring-before → | substrBefore operator |
| z. | substring-after → | substrAfter operator |
| aa. | substring → | substr operator |
| bb. | string-length → | strLength operator |
| cc. | normalize-space → | normSpace operator (Cast operator (to string) if the argument to the function is absent.) |
| dd. | translate → | translate operator |
| ee. | string → | cast operator (output = string/input types in the context) |
| ff. | boolean → | cast operator (output = Boolean/input types in the context) |
| gg. | not → | not operator |
| hh. | true → | TRUE boolean literal |
| ii. | false → | FALSE boolean literal |
| jj. | lang → | lang operator |
| kk. | number → | cast operator (output = string/input types in the context) |
| ll. | ceiling → | ceil operator |
| mm. | floor → | floor operator |
| nn. | round → | round operator |
| oo. | sum → | sum operator (on the node set) |

Index SQL Generation

After the conversion phase, well defined rules are applied to generate the Index SQL equivalent to the xpath expression. The examples of most commonly used rules are as follows:

Simple Paths

Expressions of type /a/b/c which have no other axes apart from child axes and which do not have any filters on the axis paths are rewritten to the following SQL:

```
/a/b/c→
select    pt1.pathid, pt1.rid, pt1.order_key, pt1.locator, pt1.value
from      path_table pt1
where     pt1.pathid = :B1
```

:B1 = pathid('/a/b/c')
pathid denotes an internal function used to lookup the token id associated with the concerned path.

Descendant Axes

Expressions of the type P1//P2(where sql corresponds to the rewritten SQL for expression P1 and P2 is a simple path) are rewritten using the SQL shown below:

```
P1//P2→
select pt2.pathid, . . . ,pt2.value
from path_table pt2
where pt2.pathid in (select * from
Table(cast(xdb.XMLTM_FUNCIMPL.SuffixPathids (:B1)
as xdb.PathidSet_t)))
and
exists(select pt1.*
       from (sql) pt1
       where pt2.order_key > pt1.order_key and
             pt2.order_key < xmlindex_maxchild(pt1.order_key) and
             pt1.rid = pt2.rid)
```

:B1 = pathid(2)
sys—xdbpathsuffix is a table funtion which generates the path ids corresponding to all the nodes whose paths have P2 as a suffix i.e all //P2 paths.

Wildcards

Expressions of the type P1/* (where sql corresponds to the rewritten SQL for the expression P1 and P2 is a simple expression) are rewritten using the SQL shown below:

```
P1/*/P2→
select pt2.pathid, . . . ,pt2.values
from path_table pt2, (sql) pt1
where pt2.pathid in (select * from
Table(cast(xdb.XMLTM_FUNCIMPL.SuffixPathids (:B1)
as xdb.PathidSet_t)))
and
exists(select pt1.*
       from (sql) pt1
       where pt2.order_key > pt1.order_key and
             pt2.order_key < xmlindex_maxchild(pt1.order_key) and
             depth(pt2.order_key) = depth(pt1.order_key)+1 and
             pt1.rid = pt2.rid)
```

```
:B1 = pathid(//P2)
```
depth is an internal function that can compute the depth of the element from its oreder key Converting/text( ) Functions Expressions of the form P1/text( ) are rewritten to the following SQL expression:

```
P1/text( )
→
select pt.value
from (sql) pt
``` where sql is the rewritten SQL corresponding to path P1

Filter expressions: Expressions of the type P1 [F(P2)] where P1 is a path expression, F is the filter defined on the relative path P2 and sql1 and sql2 are the index sqls for P1 and P1/P2, are rewritten to the following SQL:

```
P1[F(P2)] →
select pt1.pathid, pt1.rid, pt1.order_key, pt1.locator, pt1.value
from (sql1) pt1
where exists(select pt2.pathid, . . . ,pt2.value
             from (sql2) pt2
             where pt2.order_key > pt1.order_key and
                   pt2.order_key < maxkey(pt1.order_key)
             and pt1.rid = pt2.rid)
``` maxkey is an internal function that generates a key that is greater than the key of any descendant of the input key Logical expressions: Expression of the type E1 op E2 where op=(AND, OR) and sql1 and sql2 represent the index sqls for E1 and E2 are rewritten using the following rule:

```
E1 op E2→
select 1
from dual
where (sql1 > 0) op (sql2 > 0)
```

Relational operators: Operators of the type E1 op E2 where op=(=, !=, >, <etc.) and sql1 and sql2 represent the index SQLs for E1 and E2 are rewritten using the following rule:

```
E1 op E2 →
select 1 as value
from (sql1) a1, (sql2) a2
where a1.value op a2.value
```

Literals: The literals are converted into the following index sqls:

```
Number literal n →
select n as value
from dual
String literal s →
select 's' as value
from dual
Boolean false( ) →
select 0 as value
from dual
Boolean true( ) →
select 1 as value
from dual
```

The application of these rules is done recursively on the xpath operator tree. At any node the, SQL is first generated for its children and then plugged into the corresponding rewrite template of that node.

Execution Phase

Typically the query generation phase will generate a single SQL for the entire xpath tree in case an XML Index is present on the base table. However, certain tree patterns may not be rewritable into SQL. For such situations, some part or the entire tree may not be converted into SQL. The execution phase provides a mechanism to evaluate such trees. It reverts to functionally evaluating the operators according to their execution semantics as detailed in the operator table. Any base documents are converted into the row tuples by an XML pull parser, as described previously.

Operator Table

The following table lists all the operators, their arguments, the types of the arguments, the output type, any information needed in the context area, and the execution semantics.

| Sno. | Operator Signature | Operator Context | Execution Semantics |
|---|---|---|---|
| 1. | Node ←Child(Node) | TestType, TestData | Return the children of the argument node, which satisfies the test specified in the operator context. |
| 2. | Node ←Descendant(Node) | TestType, TestData | Return the descendants of the argument node, which satisfy the test specified in the operator context. |
| 3. | Node ←Identity(Node) | | Return the argument node. |
| 4. | Node ←Following(Node) | TestType, TestData | Return the nodes, which follow the argument node in the document and satisfy the test specified in the operator context. |
| 5. | Node ←FollowingSibling(Node) | TestType, TestData | Return the nodes, which are the siblings of the argument node |

-continued

| Sno. | Operator Signature | Operator Context | Execution Semantics |
|---|---|---|---|
| 6. | Node ←DescendantOrSelf(Node) | TestType, TestData | and follow the argument node in the document and also satisfy the test specified in the operator context. Return the argument node if it satisfies the test specified in the operator context. Also compute all the descendants of the argument node that satisfy the specified test. |
| 7. | Node ←Attribute(Node) | TestType, TestData | Return all the attributes of the argument node that satisfy the test specified in the operator context. |
| 8. | Node ←Namespace(Node) | TestType, TestData | Return the namespaces of the argument node, which satisfy the test specified in the operator context. |
| 9. | Node ←Filter(Node, Boolean) | | Return the argument node (arg1) if it satisfies the Boolean expression in arg2. |
| 10. | Node ←Union(Node, Node) | | Union of the argument nodes (arg1 and arg2) with duplicate elimination. |
| 11. | Boolean ←Or(Boolean, Boolean) | | Boolean or |
| 12. | Boolean ←And(Boolean, Boolean) | | Boolean and |
| 13. | Boolean ←Eq(Type, Type) | OperandType | = check as defined by the Type |
| 14. | Boolean ←Neq(Type, Type) | OperandType | != check as defined by the Type |
| 15. | Boolean ←Lte(Type, Type) | OperandType | <= check as defined by the Type |
| 16. | Boolean ←Lt(Type, Type) | OperandType | < check as defined by the Type |
| 17. | Boolean ←Gte(Type, Type) | OperandType | >= check as defined by the Type |
| 18. | Boolean ←Gt(Type, Type) | OperandType | > check as defined by the Type |
| 19. | Number ←Add(Number, Number) | | + |
| 20. | Number ←Sub(Number, Number) | | − |
| 21. | Number ←Mod(Number, Number) | | Mod |
| 22. | Number ←Div(Number, Number) | | / |
| 23. | Number ←Mult(Number, Number) | | * |
| 24. | Number ←Pos(Node) | | Return the position of the node in document order. |
| 25. | Number ←Count(Node) | | Count (aggregate) the number of the nodes. |
| 26. | Node ←Id(Node, String) | | Return the node whose id matches the tokens in the string argument. |
| 27. | String ←LocalName(Node) | | Return the local name of the node. |
| 28. | String ←NspaceUri(Node) | | Return the name space uri of the node. |
| 29. | String ←Name(Node) | | Return the name of the node. |
| 30. | String ←Concat(String, String) | | Return the concatenated output of the two argument strings. |
| 31. | Boolean ←StartsWith(String, String) | | Return true if the argument 1 string starts with argument 2 string else return false. |
| 32. | Boolean ←Contains(String, String) | | Return true if the argument 1 string contains the argument 2 string else return false. |
| 33. | String ←SubstrBefore(String, String) | | Return the string appearing before the first occurrence of argument 2 string in the argument 1 string. |
| 34. | String ←SubstrAfter(String, String) | | Return the string appearing after the first occurrence of argument 2 string in the argument 1 string. |
| 35. | String ←Substr(String, Number, Number) | | Return the substring in the string argument that starts at position specified by the arg2 number argument and contains |

-continued

| Sno. | Operator Signature | Operator Context | Execution Semantics |
|---|---|---|---|
| | | | arg3 number of characters. If arg3 is zero then return all the characters up to the end of the string. |
| 36. | Number ←StrLength(String) | | Return the length of the string argument. |
| 37. | String ←NormSpace(String) | | Return the argument string after stripping the leading and trailing spaces in it and converting a sequence of white spaces to single space. |
| 38. | String ←Translate(String, String, String) | | Return the translated string by replace the occurrences of characters of arg2 string with corresponding characters of arg3 string in arg1 string. |
| 39. | OutType ←Cast(InType) | OutType, InType | Casts the input type into the output type according to the casting rules. |
| 40. | Boolean ←Not(Boolean) | | Boolean not |
| 41. | Boolean ←Lang(Node, String) | | |
| 42. | Number ←Ceil(Number) | | Return the ceiling of the argument number. |
| 43. | Number ←Floor(Number) | | Return the floor of the argument number. |
| 44. | Number ←Round(Number) | | Round the argument number. |
| 45. | Number ←Sum(Number) | | Sum (aggregation) all the incoming numbers. |
| 46. | Node ←DocumentSort(Node) | | Sorts the incoming nodes in the document order. |

Hardware Overview

Figure 3:
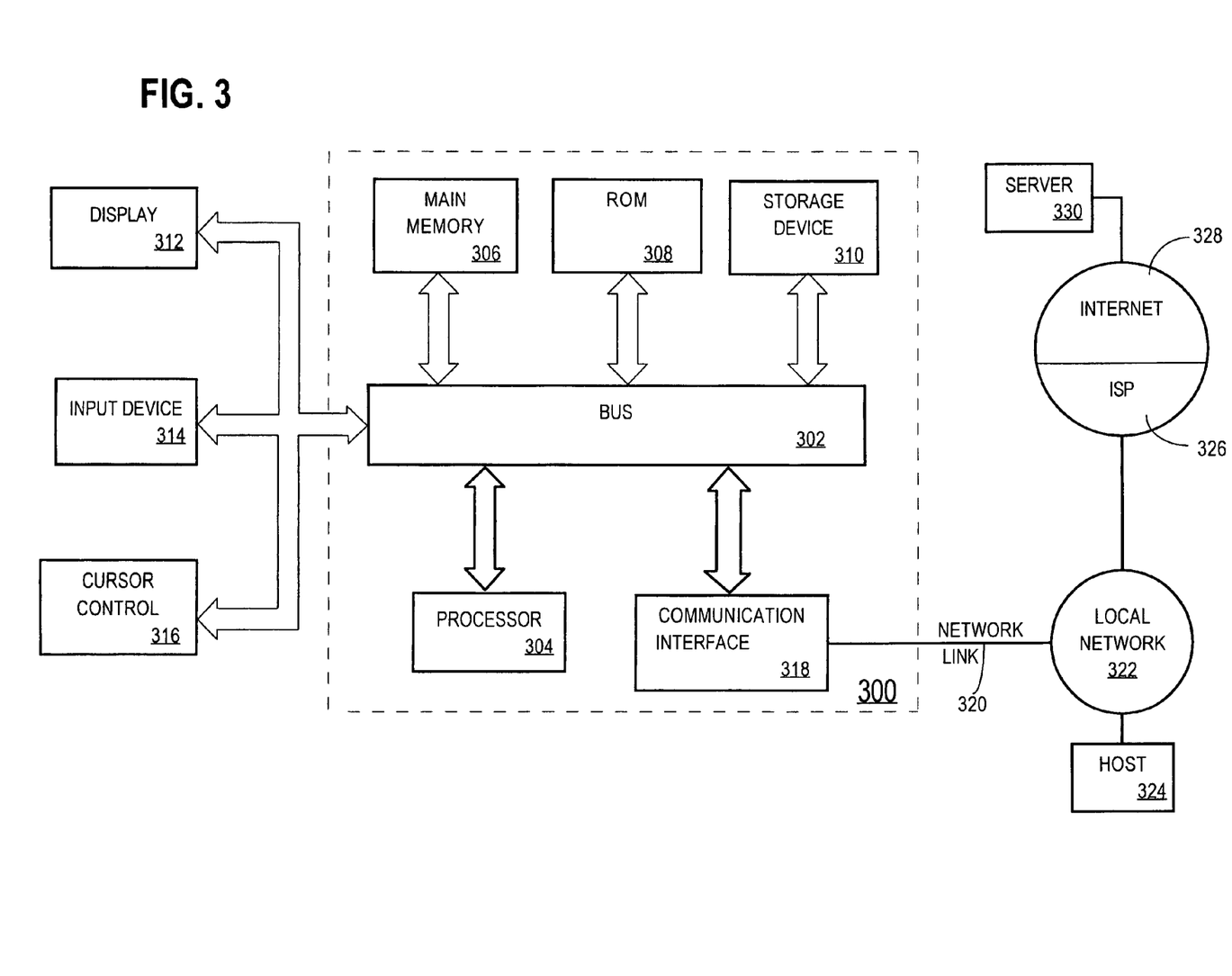
FIG. 3 shows a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing XPath expressions, comprising the steps of:
   receiving an XPath expression, wherein the XPath expression is associated with a requested operation;
   generating, based on said XPath expression, an operator tree of the XPath expression;
   wherein the operator tree comprises nodes and links;
   wherein a subset of the nodes represents operations to be performed;
   wherein each link in a subset of the links between the nodes represents a flow of data between the operations that are represented by the nodes that are linked by said each link; and
   storing the operator tree in volatile or non-volatile memory; and
   applying one or more rules to the operator tree to generate data,
   wherein the data specifies operations which, when executed, cause a database server to perform at least a portion of the requested operation;
   based on the operator tree, executing the requested operation;
   wherein executing the requested operation includes;
      beginning at leaf nodes of the operator tree, performing operations associated with the leaf nodes; and
      passing results of operations up to parent nodes of the nodes that performed the operations;
   wherein passing the results includes:
      if the parent of a node associated with an operation is a filter, then passing results of the operation to the filter, wherein the filter filters the results with a predicate statement; and
      if the parent of a node associated with an operation is an operator node, then passing results of the operation to the parent and executing the operation associated with the parent on said results.

2. The method of claim 1 wherein the step of generating a tree-based representation includes:
   creating a parse tree for the XPath expression, and
   converting the parse tree into the operator tree.

3. The method of claim 2 wherein the step of generating an operator tree further comprises the step of normalizing the parse tree by converting one or more reverse axes to forward axes.

4. The method of claim 2 wherein:
   the XPath expression includes a location step; and
   the step of converting the parse tree into the operator tree includes defining a filter operator for a relation predicate on the location step, wherein the filter operator has, on its right hand side, an operator tree corresponding to the relation predicate.

5. The method of claim 1, wherein applying the one or more rules to the operator tree comprises applying one or more rules to the operator tree to generate one or more database commands.

6. The method of claim 5, wherein the one or more database commands are Structured Query Language (SQL) commands.

7. The method of claim 6 wherein the step of applying the one or more rules to generate the SQL commands includes generating SQL commands that access an XML Index to perform the requested operation.

8. The method of claim 6 wherein the method further comprises:
   determining whether a SQL command can be generated; and
   if the SQL command cannot be generated, then functionally evaluating operators in the operator tree to perform a particular requested operation.

9. A method for processing XPath expressions, comprising the steps of:
   receiving an XPath expression, wherein the XPath expression is associated with a requested operation;
   creating a parse tree for the XPath expression;
   converting the parse tree into an operator tree;
   wherein converting the parse tree into the operator tree includes at least one of:
      converting an axis in the parse tree into a corresponding operator in the operator tree, or
      converting a pre-defined function in the parse tree into a corresponding operator in the operator tree;
   wherein the operator tree comprises nodes and links;
   wherein at least a subset of the nodes are nodes that represent operations to be performed;
   wherein each link in at least a subset of the links between the nodes represents a flow of data between the operations that are represented by the nodes that are linked by said each link; and
   storing the operator tree in volatile or non-volatile memory.

10. The method of claim 9, wherein the step of converting the parse tree into the operator tree further comprises the step of normalizing the parse tree by converting one or more reverse axes to forward axes.

11. The method of claim 9, wherein:
   the XPath expression includes a location step; and
   the step of converting the parse tree into the operator tree includes defining a filter operator for a relation predicate on the location step, wherein the filter operator has, on its right hand side, a second operator tree corresponding to the relation predicate.

12. The method of claim 9, further comprising, based on the operator tree, executing an operation associated with the XPath expression.

13. The method of claim 12, wherein the step of executing includes:
   beginning at leaf nodes of the operator tree, performing operations associated with the leaf nodes; and
   passing results of operations up to parent nodes of the nodes that performed the operations.

14. The method of claim 13, wherein the step of passing results includes:
   if the parent of a node associated with an operation is a filter, then passing results of the operation to the filter, wherein the filter filters the results with a predicate statement; and
   if the parent of a node associated with an operation is an operator node, then passing results of the operation to the parent and executing the operation associated with the parent on said results.

15. The method of claim 9, further comprising the step of applying one or more rules to the operator tree generate one or more database commands which, when executed, cause a database server to perform at least a portion of the requested operation.

16. The method of claim 15, wherein applying the one or more rules comprises generating one or more database commands that access an XML Index to perform the portion of the requested operation.

17. The method of claim 9, further comprising:
   determining whether a database command can be generated; and
   if a database command cannot be generated, then functionally evaluating one or more operators in the operator tree to perform a particular requested operation.

18. A machine-readable storage medium storing instructions for processing XPath expressions, wherein the instructions, when executed by one or more processors, causes the one or more processors to perform the steps of:
   receiving an XPath expression, wherein the XPath expression is associated with a requested operation;
   generating, based on said XPath expression, an operator tree of the XPath expression;
   wherein the operator tree comprises nodes and links;
   wherein a subset of the nodes represents operations to be performed;
   wherein each link in a subset of the links between the nodes represents a flow of data between the operations that are represented by the nodes that are linked by said each link; and
   storing the operator tree in volatile or non-volatile memory; and
   applying one or more rules to the operator tree to generate, wherein the data specifies operations which, when executed, cause a database server to perform at least a portion of the requested operation;
   based on the operator tree, executing the requested operation;
   wherein executing the requested operation includes:
      beginning at leaf nodes of the operator tree, performing operations associated with the leaf nodes; and
      passing results of operations up to parent nodes of the nodes that performed the operations;
   wherein passing the results includes:
      if the parent of a node associated with an operation is a filter, then passing results of the operation to the filter, wherein the filter filters the results with a predicate statement; and
      if the parent of a node associated with an operation is an operator node, then passing results of the operation to the parent and executing the operation associated with the parent on said results.

19. The machine-readable storage medium of claim 18, wherein the step of generating a tree-based representation includes: creating a parse tree for the XPath expression, and converting the parse tree into the operator tree.

20. The machine-readable storage medium of claim 19, wherein the step of generating an operator tree further comprises the step of normalizing the parse tree by converting one or more reverse axes to forward axes.

21. The machine-readable storage medium of claim 19, wherein:
   the XPath expression includes a location step; and
   the step of converting the parse tree into the operator tree includes defining a filter operator for a relation predicate on the location step, wherein the filter operator has, on its right hand side, an operator tree corresponding to the relation predicate.

22. The machine-readable storage medium of claim 18, wherein applying the one or more rules to the operator tree comprises applying one or more rules to the operator tree to generate one or more database commands.

23. The machine-readable storage medium of claim 22, wherein the one or more database commands are Structured Query Language (SQL) commands.

24. The machine-readable storage medium of claim 23, wherein the step of applying the one or more rules to generate the SQL commands includes generating SQL commands that access an XML Index to perform the requested operation.

25. The machine-readable storage medium of claim 23, wherein the instructions include instructions which, when executed by the one or more processors, further cause the one or more processors to perform the steps of: determining whether a SQL command can be generated; and
    if the SQL command cannot be generated, then functionally evaluating one or more operators in the operator tree to perform a particular requested operation.

26. A machine-readable storage medium storing instructions for processing XPath expressions, wherein the instructions, when executed by one or more processors, cause the one or more processors to perform the steps of:
    receiving an XPath expression, wherein the XPath expression is associated with a requested operation;
    creating a parse tree for the XPath expression;
    converting the parse tree into an operator tree;
    wherein converting the parse tree into the operator tree includes at least one of:
        converting an axis in the parse tree into a corresponding operator in the operator tree, or
        converting a pre-defined function in the parse tree into a corresponding operator in the operator tree;
    wherein the operator tree comprises nodes and links;
    wherein at least a subset of the nodes are nodes that represent operations to be performed;
    wherein each link in at least a subset of the links between the nodes represents a flow of data between the operations that are represented by the nodes that are linked by said each link; and
    storing the operator tree in volatile or non-volatile memory.

27. The machine-readable storage medium of claim 26, wherein the step of converting the parse tree into the operator tree further comprises the step of normalizing the parse tree by converting one or more reverse axes to forward axes.

28. The machine-readable storage medium of claim 26, wherein:
    the XPath expression includes a location step; and
    the step of converting the parse tree into the operator tree includes defining a filter operator for a relation predicate on the location step, wherein the filter operator has, on its right hand side, a second operator tree corresponding to the relation predicate.

29. The machine-readable storage medium of claim 26, wherein the instructions include instructions which, when executed by the one or more processors, further cause the one or more processors to perform the step of, based on the operator tree, executing an operation associated with the XPath expression.

30. The machine-readable storage medium of claim 29, wherein the step of executing includes:
    beginning at leaf nodes of the operator tree, performing operations associated with the leaf nodes; and
    passing results of operations up to parent nodes of the nodes that performed the operations.

31. The machine-readable storage medium of claim 30, wherein the step of passing results includes:
    if the parent of a node associated with an operation is a filter, then passing results of the operation to the filter, wherein the filter filters the results with a predicate statement; and
    if the parent of a node associated with an operation is an operator node, then passing results of the operation to the parent and executing the operation associated with the parent on said results.

32. The machine-readable storage medium of claim 26, wherein the instructions include instructions which, when executed by the one or more processors, further cause the one or more processors to perform the steps of applying one or more rules to the operator tree generate one or more database commands which, when executed, cause a database server to perform at least a portion of the requested operation.

33. The machine-readable storage medium of claim 32, wherein applying the one or more rules comprises generating one or more database commands that access an XML Index to perform the portion of the requested operation.

34. The machine-readable storage medium of claim 26, wherein the instructions include instructions which, when executed by the one or more processors, further cause the one or more processors to perform the steps of:
    determining whether a database command can be generated; and
    if a database command cannot be generated, then functionally evaluating one or more operators in the operator tree to perform a particular requested operation.

\* \* \* \* \*

UNITED STATES PATENT AND TRADEMARK OFFICE
CERTIFICATE OF CORRECTION

| | | |
|---|---|---|
| PATENT NO. | : 7,603,347 B2 | Page 1 of 1 |
| APPLICATION NO. | : 10/944171 | |
| DATED | : October 13, 2009 | |
| INVENTOR(S) | : Ashish Thusoo et al. | |

It is certified that error appears in the above-identified patent and that said Letters Patent is hereby corrected as shown below:

Title page, item (*) Notice:   Subject to any disclaimer, the term of this patent is extended or adjusted under 35 U.S.C. 154(b) by 343 days.

Delete the phrase "by 343 days" and insert -- by 585 days --.

In column 1, line 19, delete "XQUERIES" and insert -- XQUERY QUERIES --, therefor.

In column 6, line 46, delete "funtion" and insert -- function --, therefor.

In column 7, line 5, delete "oreder" and insert -- order --, therefor.

In column 15, line 8, in claim 8, after "evaluating" insert -- one or more --.

Signed and Sealed this

Seventeenth Day of August, 2010

David J. Kappos
*Director of the United States Patent and Trademark Office*